(12) United States Patent
Fang et al.

(10) Patent No.: US 11,880,971 B2
(45) Date of Patent: Jan. 23, 2024

(54) INSPECTION METHOD AND SYSTEM

(71) Applicant: ASML Netherlands B.V., Veldhoven (NL)

(72) Inventors: Wei Fang, Milpitas, CA (US); Zhao-Li Zhang, San Jose, CA (US); Jack Jau, Los Altos Hills, CA (US)

(73) Assignee: ASML Netherlands B.V., Veldhoven (NL)

( * ) Notice: Subject to any disclaimer, the term of this patent is extended or adjusted under 35 U.S.C. 154(b) by 157 days.

(21) Appl. No.: 17/671,522

(22) Filed: Feb. 14, 2022

(65) Prior Publication Data

US 2022/0245780 A1 Aug. 4, 2022

Related U.S. Application Data

(63) Continuation of application No. 16/895,412, filed on Jun. 8, 2020, now Pat. No. 11,250,559, which is a continuation of application No. 16/160,958, filed on Oct. 15, 2018, now Pat. No. 10,679,340, which is a continuation of application No. 14/738,791, filed on Jun. 12, 2015, now Pat. No. 10,102,619, which is a continuation of application No. 13/073,253, filed on Mar. 28, 2011, now abandoned.

(51) Int. Cl.
| | |
|---|---|
| G06K 9/00 | (2022.01) |
| G06T 7/00 | (2017.01) |
| G06V 10/44 | (2022.01) |
| G06V 10/50 | (2022.01) |
| G06V 10/46 | (2022.01) |

(52) U.S. Cl.
CPC ............ G06T 7/001 (2013.01); G06T 7/0004 (2013.01); G06V 10/44 (2022.01); G06V 10/50 (2022.01); G06T 2207/10004 (2013.01); G06T 2207/10061 (2013.01); G06T 2207/30148 (2013.01); G06V 10/467 (2022.01); G06V 2201/06 (2022.01)

(58) Field of Classification Search
CPC ................... G06T 7/001; G06T 7/0004; G06T 2207/30148; G06T 2207/10004; G06T 2207/10061; G06K 9/4642; G06K 9/4671; G06K 9/4604; G06K 2209/19; G06K 2009/4666
See application file for complete search history.

(56) References Cited

U.S. PATENT DOCUMENTS

| | | | |
|---|---|---|---|
| 6,292,583 B1 | 9/2001 | Maruo | |
| 6,330,053 B1 | 12/2001 | Takayama | |
| 6,504,947 B1 | 1/2003 | Nozaki et al. | |
| 6,713,761 B2 * | 3/2004 | Nakada | H01J 37/28 850/10 |

(Continued)

*Primary Examiner* — Howard D Brown, Jr.
(74) *Attorney, Agent, or Firm* — Finnegan, Henderson Farabow, Garrett & Dunner, LLP

(57) ABSTRACT

An inspection method includes the following steps: identifying a plurality of patterns within an image; and comparing the plurality of patterns with each other for measurement values thereof. The above-mentioned inspection method uses the pattern within the image as a basis for comparison; therefore, measurement values of the plurality of pixels constructing the pattern can be processed with statistical methods and then compared, and the false rate caused by variation of a few pixels is decreased significantly. An inspection system implementing the above-mentioned method is also disclosed.

20 Claims, 7 Drawing Sheets

(56) References Cited

U.S. PATENT DOCUMENTS

| | | |
|---|---|---|
| 6,759,655 B2 | 7/2004 | Nara et al. |
| 7,019,294 B2 | 3/2006 | Koyama et al. |
| 7,054,485 B2 | 5/2006 | Li et al. |
| 7,117,477 B2 | 10/2006 | Ye et al. |
| 7,117,478 B2 | 10/2006 | Ye et al. |
| 7,138,629 B2 | 11/2006 | Noji et al. |
| 7,268,807 B2 | 9/2007 | Nakamura et al. |
| 7,526,119 B2 | 4/2009 | Isomura et al. |
| 8,026,961 B2 | 9/2011 | Takenaka et al. |
| 8,254,682 B2 | 8/2012 | Chao |
| 8,463,035 B2 | 6/2013 | Bechtel |
| 8,547,416 B2 | 10/2013 | Ozawa et al. |
| 8,629,394 B2 * | 1/2014 | Madokoro ............ H01J 37/153 250/306 |
| 8,643,035 B2 | 2/2014 | Kim |
| 9,778,206 B2 * | 10/2017 | Honda ................ G01N 21/956 |
| 10,102,619 B1 * | 10/2018 | Fang ..................... G06V 10/44 |
| 2002/0190229 A1 | 12/2002 | Nakamura et al. |
| 2003/0021462 A1 | 1/2003 | Sakai et al. |
| 2003/0048940 A1 * | 3/2003 | Onoyama ............... G06T 7/001 382/149 |
| 2004/0062432 A1 | 4/2004 | Ishikawa |
| 2004/0086168 A1 * | 5/2004 | Kuwabara ............. G06T 7/001 382/145 |
| 2004/0240723 A1 | 12/2004 | Sakai et al. |
| 2004/0264760 A1 * | 12/2004 | Ishikawa ............. G06T 7/0004 382/145 |
| 2006/0098863 A1 * | 5/2006 | Ishikawa ......... G01N 21/95607 382/149 |
| 2006/0243908 A1 | 11/2006 | Shinada et al. |
| 2006/0251340 A1 | 11/2006 | Karsenti |
| 2007/0031025 A1 | 2/2007 | Lim et al. |
| 2007/0053580 A1 * | 3/2007 | Ishikawa ................ G06T 7/001 382/149 |
| 2010/0195908 A1 | 8/2010 | Bechtel |
| 2012/0026316 A1 | 2/2012 | Nagahama |

\* cited by examiner

INSPECTION METHOD AND SYSTEM

CROSS-REFERENCE TO RELATED APPLICATIONS

This application is a continuation of U.S. patent application Ser. No. 16/895,412, filed Jun. 8, 2020, which is a continuation of U.S. patent application Ser. No. 16/160,958, filed Oct. 15, 2018, (now U.S. Pat. No. 10,679,340), which is a continuation of U.S. patent application Ser. No. 14/738,791, filed Jun. 12, 2015, (now U.S. Pat. No. 10,102,619), which is a continuation application of U.S. patent application Ser. No. 13/073,253, filed Mar. 28, 2011, now abandoned. The disclosures of the above-referenced applications are incorporated herein by reference in their entireties.

BACKGROUND OF THE INVENTION

1. Field of the Invention

The present invention relates to an inspection method and system, and more particularly to an inspection method and system for determining an inconsistency in an image through pattern-to-pattern comparison.

2. Description of the Prior Art

How to inspect defects on a semiconductor device is one of the major subjects in a semiconductor manufacturing process. A prior art method for inspecting defects includes capturing a scanned image of a semiconductor device, such as a scanning electron microscope (SEM) image, and then determining the presence of a defect of the semiconductor device in the scanned image.

A defect determining method of prior art compares different images for inconsistency to determine whether there is any defect within the images. The comparison method is based on pixel-to-pixel comparison among images. For example, referring to FIG. 1a, each pixel 11a within the image 1a is compared with each corresponding pixel 11b and 11c within the image 1b and 1c. If one of the image (e.g. 1a) is found inconsistent with the other images (e.g. 1b, 1c), a defect may be present within such inconsistent image (e.g. 1a). For example, the pixel 12a within the image 1a may be a defect.

However, the pixel-to-pixel comparison shall increase false rate caused by gray level variation at edges of a pattern or single pixel. For example, the pixel 12a within the image 1a simply may be gray level variation induced while scanning image, or a defect which can be ignored.

Furthermore, it is more difficult to define patterns such as hole pattern, and positions of patterns by pixel based inspection. Referring to FIG. 1b, with the pixel based inspection, a plurality of pixels 12b within the image 1b can be determined as defects. However, unaware that the plurality of pixels 12b all belongs to a hole pattern, the pixel-to-pixel comparison is unable to distinguish that the image where only a single defect pixel 12a is present in the hole pattern is more likely to have a false defect than the image where the plurality of defect pixels 12b are present in the hole pattern.

Accordingly, it is highly desirable to provide an inspection method to decrease the false rate.

SUMMARY OF THE INVENTION

The present invention is directed to an inspection method and system which compare patterns within one or more images based on an original design or predictable pattern. Therefore, the measurement value of a plurality of pixels constructing the pattern can be processed with statistical methods and then compared so that the false rate caused by the variation at the edge of the pattern or a few pixels is decreased.

In one embodiment, the proposed inspection method includes the following steps: identifying a plurality of patterns within an image; and comparing the plurality of patterns with each other for measurement values thereof.

In one embodiment, the proposed inspection system includes means for identifying a plurality of patterns within an image and means for comparing the plurality of patterns with each other for measurement values thereof.

In one embodiment, the proposed inspection method based on a database includes the following steps: scanning a surface of a specimen to obtain an image by using a scanning electron microscope (SEM); identifying a plurality of patterns within the image; and comparing the plurality of patterns including the same feature with each other for measurement values thereof, wherein the feature includes pattern types, pattern sizes, pattern locations, or any combination thereof.

In one embodiment, the proposed inspection system includes an image generating device, an image analyzing module and a comparison module. The image generating device is configured for detecting a surface of a specimen to generate an image. The image analyzing module is configured for receiving the image to identify a plurality of patterns within the image, wherein the plurality of patterns comprise holes, circuits, devices, or any combination thereof. The comparison module is configured for comparing the plurality of patterns including the same feature as each other for measurement values thereof, wherein the feature includes pattern types, pattern sizes, and pattern locations, or any combination thereof.

The objective, technologies, features and advantages of the present invention will become apparent from the following description in conjunction with the accompanying drawings wherein certain embodiments of the present invention are set forth by way of illustration and example.

BRIEF DESCRIPTION OF THE DRAWINGS

The foregoing conceptions of this invention and their accompanying advantages will become more readily appreciated after being better understood by referring to the following detailed description, in conjunction with the accompanying drawings, wherein.

DESCRIPTION OF THE PREFERRED EMBODIMENT

The detailed explanation of the present invention is described as follows. The described preferred embodiments are presented for purposes of illustrations and description, and they are not intended to limit the scope of the present invention.

Figure 1A:
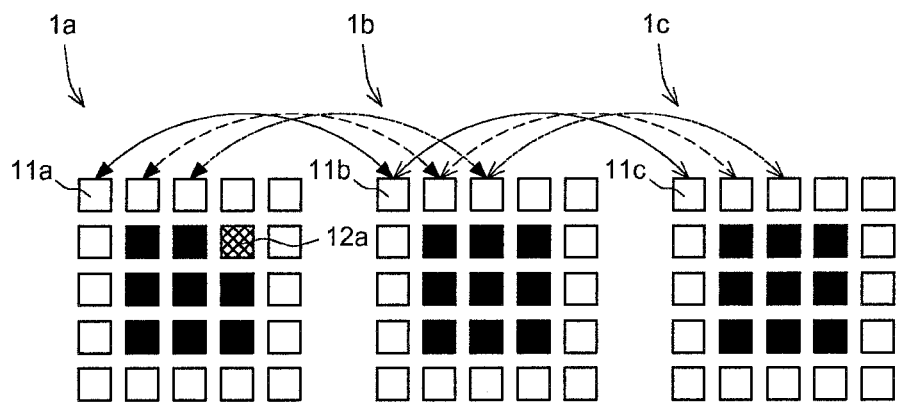
FIG. 1a and FIG. 1b are diagrams schematically illustrating an inconsistency determining step of an inspection method according to a prior art.
Figure 1B:
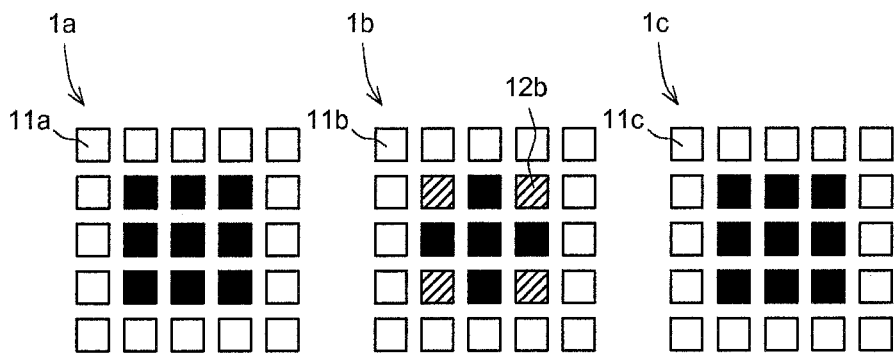
Figure 2:
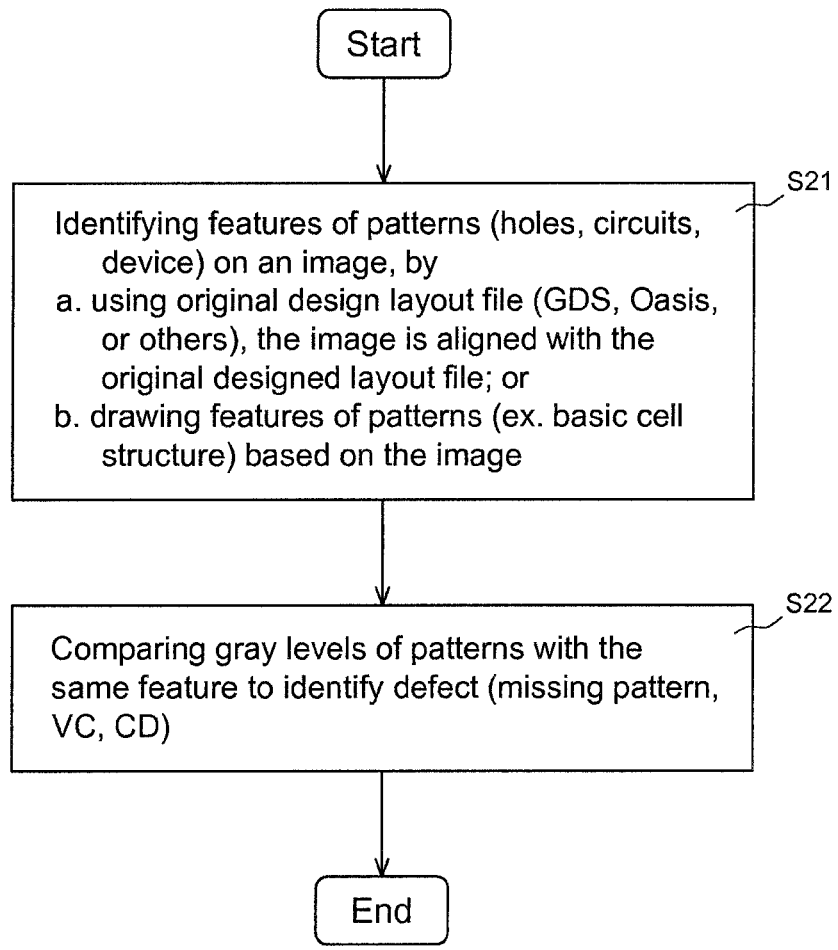
FIG. 2 is a flowchart schematically illustrating steps of an inspection method according to an embodiment of the present invention.

Referring to FIG. 2, an inspection method of an embodiment of the present invention comprises identifying a plurality of patterns within an image (step S21); and comparing the plurality of patterns with each other for measurement values thereof (step S22) to identify defect. For example, the pattern can be a contact, via hole, a circuit, a device (such as an isolation device, MOS device, capacitor, or inductor etc.), or any combination thereof. In one embodiment, the patterns compared with each other include the same feature, such as pattern types, pattern sizes, pattern locations, pattern periods, etc.; and the measurement value may be gray level, color (This should not be in the target, please the inventors check), or brightness, etc. It should be noted that the patterns may be within one image or different images.

Figure 3:
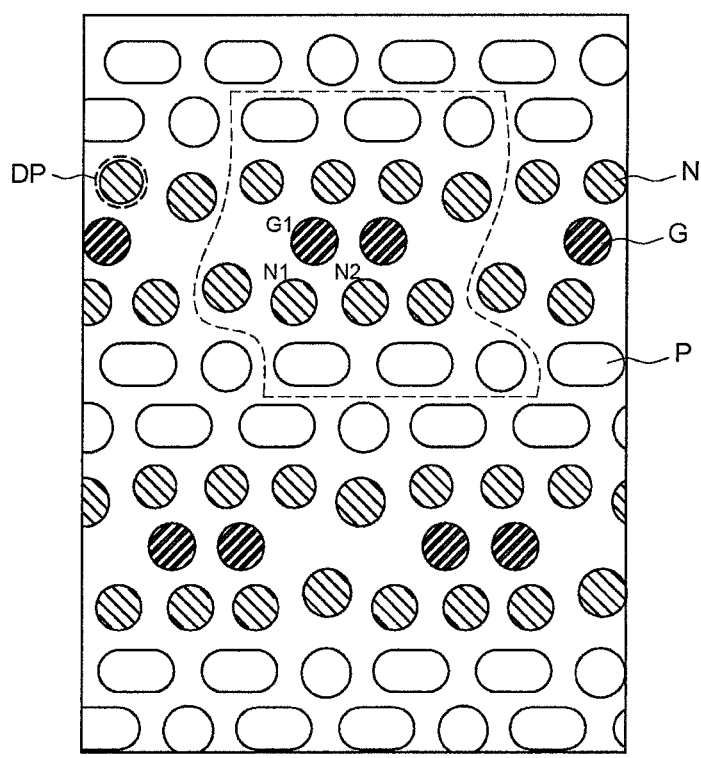
FIG. 3 is a diagrams schematically illustrating a part of an image of memory cell.

In one embodiment, the step S21 further comprises loading an original design layout file, such as graphic data system (GDS), open artwork system interchange standard (OASIS) or others. And, the image is aligned with the original design layout file; therefore a plurality of patterns within the image can be identified corresponding to the positions of those in the original design layout file. Alternatively, referring to FIG. 3, the patterns DP can be drawn on the image. For example, FIG. 3 illustrates a part of an image of memory cell which includes a few patterns that are the same and/or periods of repeat patterns, a period of which is shown as the region enclosed by dotted line. Corresponding to the drawn patterns DP, the patterns on the image with the same feature are identified and compared to identify defect.

Figure 4A:
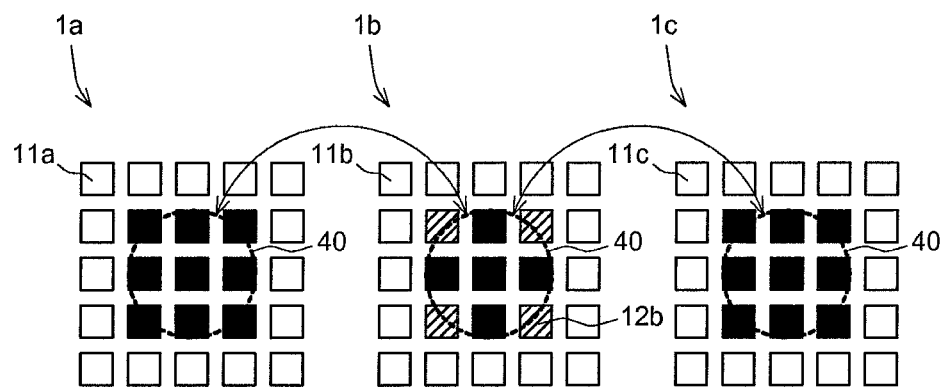
FIG. 4a and FIG. 4b are diagrams schematically illustrating an inconsistency determining step of an inspection method according to an embodiment of the present invention.

It should be noted that the comparison in step S22 is based on the patterns, and every gray level of every pixel of each patterns are compared. For example, referring to FIG. 4a, the patterns 40 are defined by 9 pixels within the images 1a, 1b, and 1c. When the patterns 40 within the images 1a, 1b, and 1c are compared, measurement values (such as gray level) of the 9 pixels constructing the pattern 40 can be processed with statistical methods and then compared. For example, the measurement values of the pixels constructing the pattern 40 can be averaged and then compared. As illustrated in FIG. 4a, the pattern corresponding to the pattern 40 within the image 1b includes a plurality of pixels 12b with higher gray level (i.e. brighter pixel). Therefore, the averaged gray level of all pixels of the pattern within the image 1b will be higher than the averaged gray level of corresponding pixels of the pattern within the image 1a and 1c, which indicates that the pattern within the image 1b may be a defect.

Figure 4B:
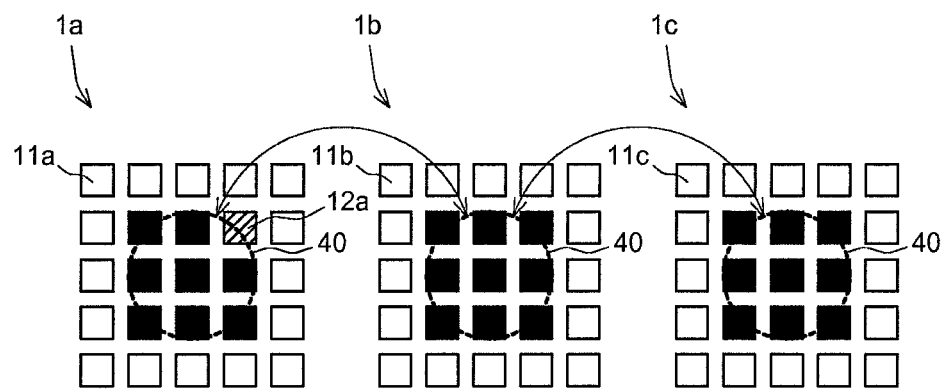

Referring to FIG. 4b, the influence of variation of a single pixel 12a on the average value of the pixels constructing the pattern is smaller and the defect pixel 12a can be ignored. Accordingly, the false defect caused by variation of single pixel (as illustrated in FIG. 4b) can be excluded. It should be noted that the more pixels the pattern is constructed of, the more tolerant the inspection is to the variation of pixels, and thereby reducing the false rate.

In one embodiment, the pixels with maximum or minimum measurement value and locations thereof are compared between the patterns, so that the distribution of the pixels with different measurement values with respect to the pattern can be defined. As mentioned earlier, the defect within the image 1b can be determined by comparing the averaged gray level of the pixels constructing the pattern 40. Then, by analyzing the distribution of the pixels 12b with different measurement values it is observed that the brighter pixels are distributed at edges of the pattern. Therefore, the defect within the image 1b can be determined as a defect with a smaller than usual pattern. It should be noted that measurement values of the pixels constructing the patterns can be processed with other statistical methods, such as mode, standard deviation, median etc.

Figure 5:
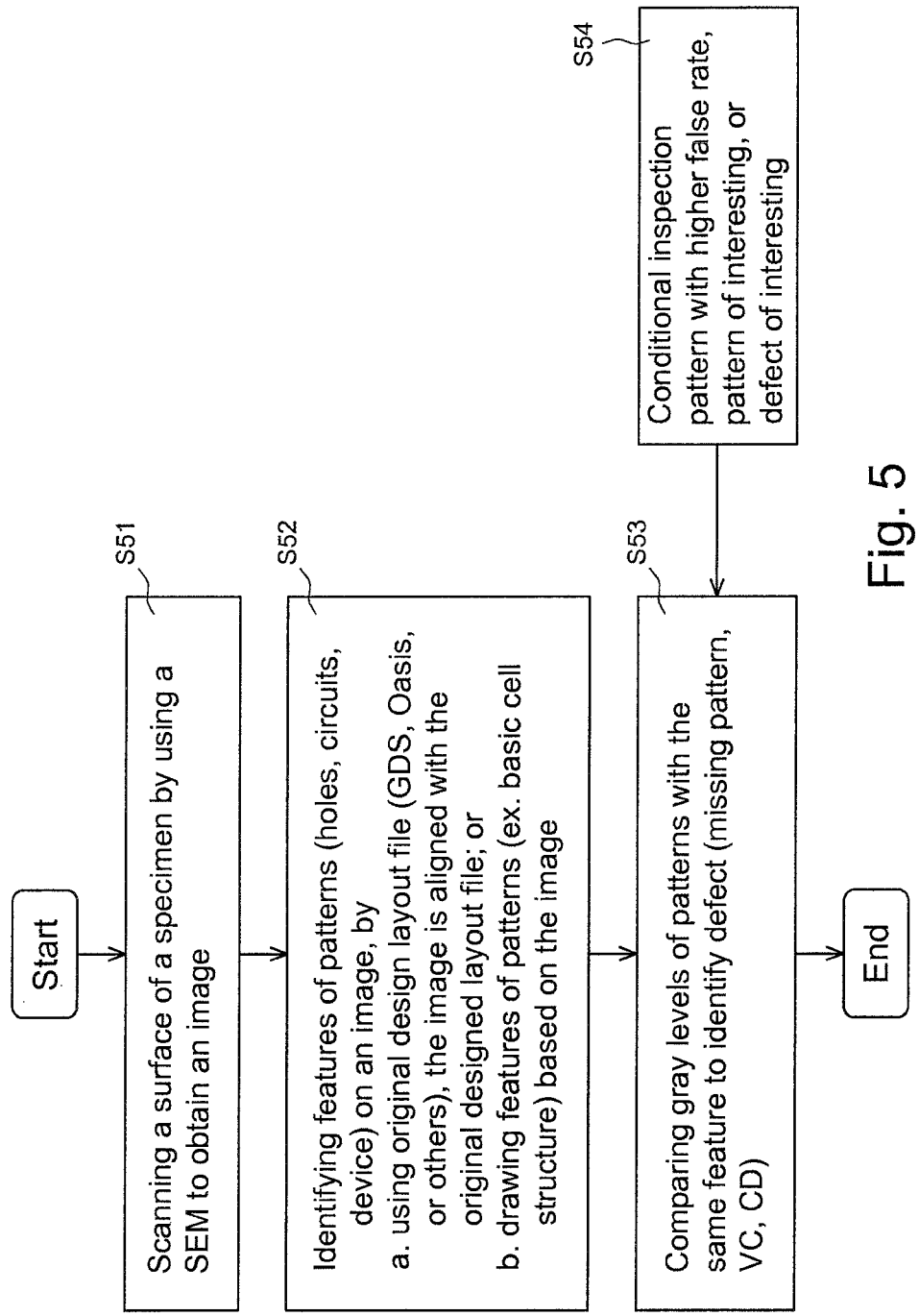
FIG. 5 is a flowchart schematically illustrating steps of an inspection method according to an embodiment of the present invention.

Referring to FIG. 5, an inspection method based on a database of an embodiment of the present invention comprises: scanning a surface of a specimen (such as a reticle or a wafer) to obtain an image by using a scanning electron microscope (SEM) (step S51); identifying a plurality of patterns within an image (step S52); and comparing the plurality of patterns with each other for measurement values thereof (step S53) to identify defect. The database is constructed by classifying and identifying every feature of patterns on an image by using the original design layout file, or by directly drawing every feature of patterns. The detail description of the steps S52 and S53 has been provided above and would be skipped here.

In one embodiment, the images can be obtained by using an optical means to capture a surface of a specimen. The optical means here includes any facility for inspecting or detecting inconsistency by using electromagnetic waves at different wavelengths.

Referring to FIG. 5, the inspection method of the present invention can implement conditional inspection (step S54). The conditional inspection means that the comparing step S53 focuses on the patterns with higher false rate, pattern of interesting, or defect of interesting etc. For example, referring to FIG. 3 again, the label G represents a gate electrode of MOS (Metal Oxide Semiconductor); the label N represents an n-type electrode of MOS; and the label P represents a p-type electrode of MOS. If the gray level of the plug N1 or N2 is bright, the plug G1 will be inspected, otherwise the plug G1 will not be inspected. Accordingly, the conditional inspection can save computing resources, reduce inspection duration, and facilitate trouble shooting. And based on the conditional inspection, the defect of interesting will be caught more easily.

According to an embodiment of the present invention, an inspection system comprises means for identifying a plurality of patterns within an image and means for comparing the plurality of patterns with each other for measurement values thereof. The inspection system implements the steps S21 and S22 as illustrated in FIG. 2. The detail description of the steps of the method of the present invention has been provided previously and will not be repeated here.

Figure 6:
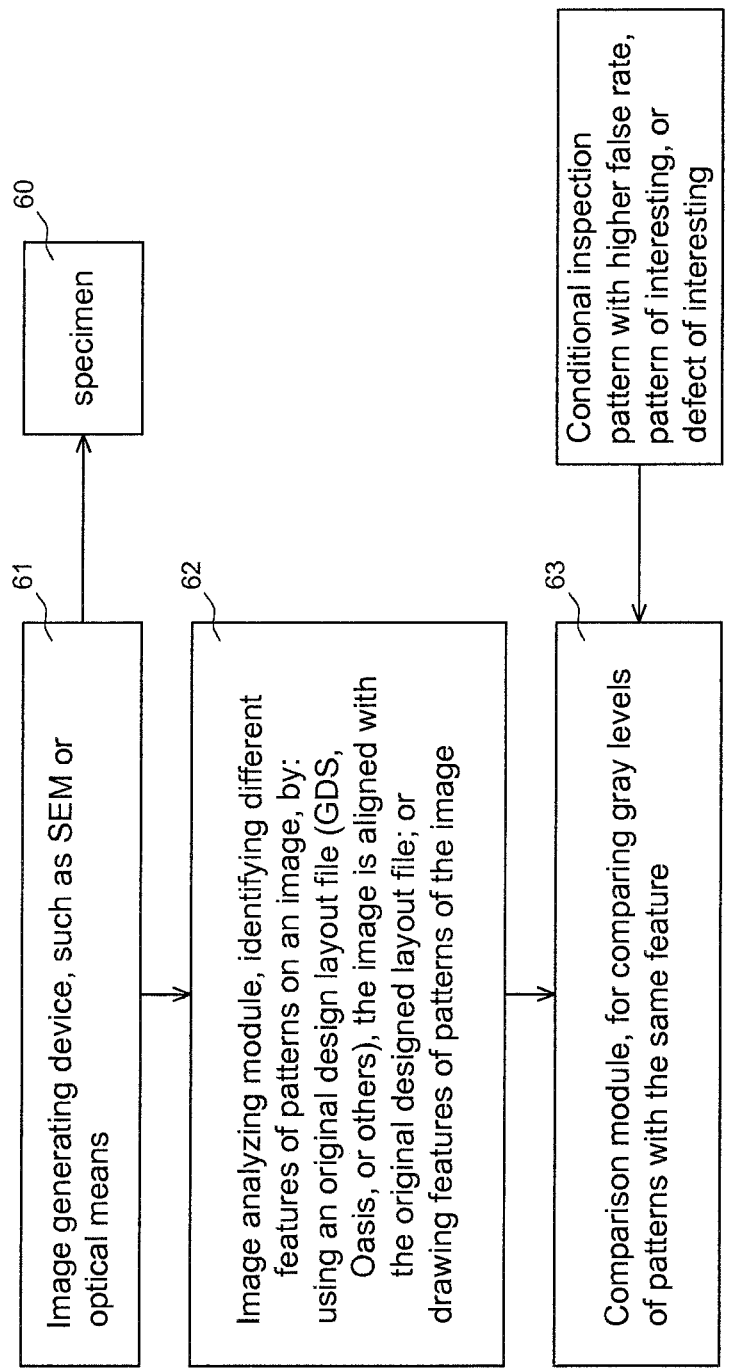
FIG. 6 is a block diagram schematically illustrating an inspection system according to an embodiment of the present invention.

Referring to FIG. 6, which illustrates an inspection system according to an embodiment of the present invention. The inspection system comprises an image generating device 61, an image analyzing module 62 and a comparison module 63. The image generating device 61 may be a scanning electron microscope (SEM) to scan or an optical means to capture a surface of a specimen 60 to obtain an image. The image analyzing module 62 is configured for identifying different features of patterns on the image. The comparison module 63 is configured for comparing gray levels of patterns with the same feature. The comparison module 63 can implement the conditional inspection. The detail description of the feature identifying step and the comparing step has been provided above and would be skipped here.

Figure 7:
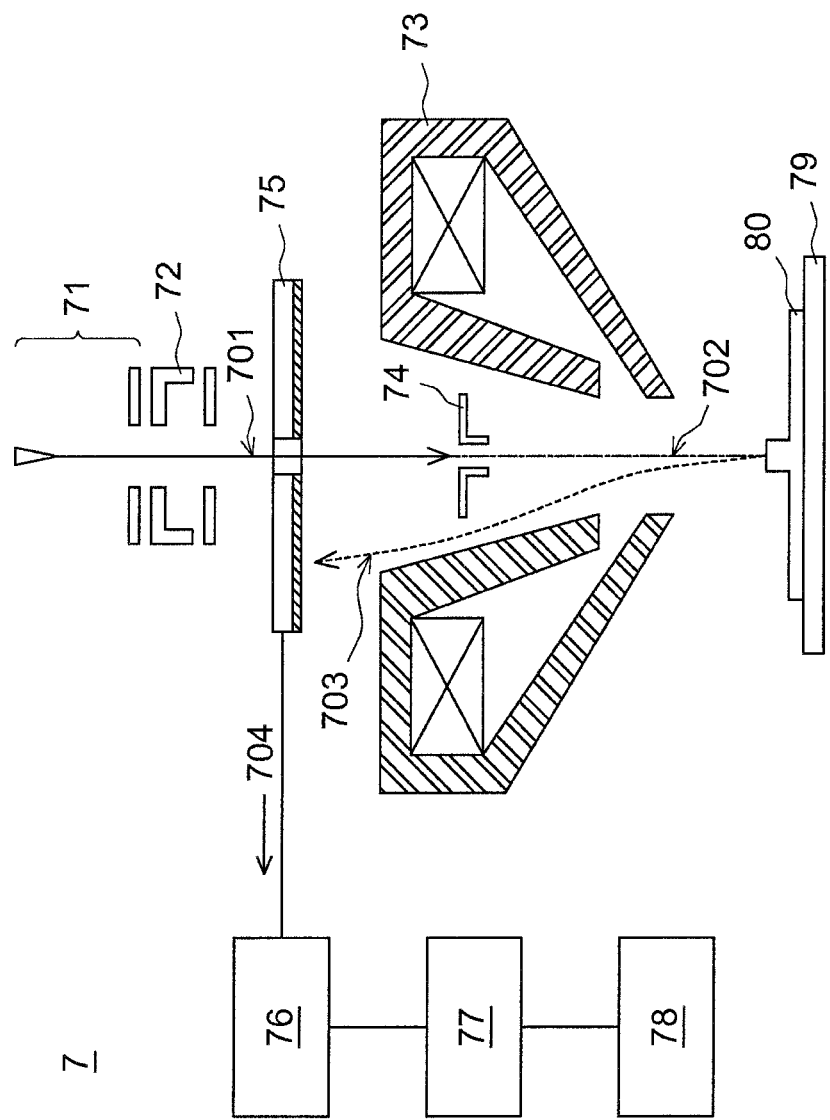
FIG. 7 is a diagram schematically illustrating an inspection system according to an embodiment of the present invention.

Referring to FIG. 7, which illustrates an inspection system 7 according to an embodiment of the present invention. The inspection system 7 is used for inspecting a specimen 80 on a sample stage 79 and comprises a charged particle beam generator 71, a condenser lens module 72, a probe forming objective lens module 73, a charged particle beam deflection module 74, a secondary charged particle detector module 75, an image forming module 76, an image analyzing module 77 and a comparison module 78.

The charged particle beam generator 71 is used for generating a primary charged particle beam 701. The condenser lens module 72 is used for condensing the generated primary charged particle beam 701. The probe forming objective lens module 73 is used for focusing the condensed primary charged particle beam into a charged particle beam probe 702. The charged particle beam deflection module 74 is used to have the formed charged particle beam probe 702 to scan across a surface of the specimen 80 secured on the sample stage 79.

The secondary charged particle detector module 75 is used for detecting secondary charged particles 703 emitted from the surface of the specimen (may also be along with other reflected or scattered charged particles from the surface of the specimen) upon being bombarded with the charged particle beam probe 702 to generate a secondary charged particle detection signal 704. It should be noted that the secondary charged particle detector module 75 can be arranged at other place, such as the side of the charged particle beam deflection module 74 or the specimen 80, or between the charged particle beam deflection module 74 and the specimen 80.

The image forming module 76 is coupled with the secondary charged particle detector module 75 for receiving the secondary charged particle detection signal 704 from the secondary charged particle detector module 75 and forming at least one charged particle microscopic image accordingly. It should be noted that the image may display the structures on the surface of the specimen 80, and/or the structures underneath the surface. The image forming module 76 may be a mainframe host, terminals, personal computers, any kind of mobile computing devices or combination thereof. In addition, the image forming module 76 may be connected with the secondary charged particle detector module 75 through a medium selected from the following: cable wire, optical fiber cable, portable storage media, IR, Bluetooth, intranet, Internet, wireless network, wireless radio, or any combination thereof.

In one embodiment, the charged particle beam generator 71, the condenser lens module 72, the probe forming objective lens module 73, the charged particle beam deflection module 74, the secondary charged particle detector module 75 and the image forming module 76, or their equivalent designs, alternatives or any combination thereof, together form an image generating device which generates an image from detected secondary charged particles emitted from specimen 80 being bombarded with charged particle beam probe 702.

The above components of an inspection system are well known to those skilled in the art and are not presented here to limit the scope of the present invention. Alternatives, equivalents and modifications of these components should still be within the scope of disclosure of the present invention.

The image analyzing module 77 is coupled to the image forming module 76 to identify a plurality of patterns within the image received from image forming module 76. In one embodiment, the image analyzing module 77 connects to and accesses the image forming module 76 through a medium selected from the following: cable wire, optical fiber cable, portable storage media, IR, human manual input, Bluetooth, intranet, Internet, wireless network, wireless radio, or any combination thereof. Further, the image analyzing module 77 may be implemented as one selected from the following: a mainframe host, a terminal computer, a personal computer, any kind of mobile computing devices, or any combination thereof. The comparison module 78 is coupled to the image analyzing module 77 to compare the plurality of patterns including the same feature with each other for measurement values thereof. In one embodiment, computer programs for identifying the patterns and comparing measurement values of the patterns are encoded on computer readable media disposed within the image analyzing module 77 and the comparison module 78 so that the image analyzing module 77 and the comparison module 78 are able to perform the steps of inspection method illustrated in conjunction with FIG. 2.

To summarize the foregoing descriptions, the inspection method and system of the present invention use patterns within one or more images as a basis for comparison to determine inconsistency between patterns, therefore, the following advantages can be achieved: 1) Measurement values of a plurality of pixels constructing the pattern can be processed with statistical methods and then compared, and false rate especially caused by hole pattern, repeat patterns, edge of pattern, and variation of a few pixels is decreased significantly. 2) The inspection method and system of the present invention include the original design layout information, therefore the patterns, especially hole pattern, within the image is easy to define, and sensitivity of inspection is increased. 3) Patterns with different sizes, especially hole pattern, can be discriminated and compared exactly. 4) Conditional inspection can be implemented to decrease inspection duration significantly. 5) The defect determined from the image can be classified during inspection without ADC (automatic defect classification) training. 6) Critical dimension (CD) defect is easy to capture.

While the invention is susceptible to various modifications and alternative forms, a specific example thereof has been shown in the drawings and is herein described in detail. It should be understood, however, that the invention is not to be limited to the particular form disclosed, but to the contrary, the invention is to cover all modifications, equivalents, and alternatives falling within the spirit and scope of the appended claims.

What is claimed is:

1. A defect inspection system comprising:
an inspection tool for inspecting a semiconductor specimen;
a memory storing instructions; and
a controller communicatively coupled to the inspection tool and memory, the controller being configured to cause the defect inspection system to:
identify, within an image of a semiconductor specimen, a plurality of patterns corresponding to a plurality of circuit structures formed on the semiconductor specimen, respectively;
for each of the plurality of patterns, determine a statistical value associated with pixel values of the pattern;

perform a comparison of the statistical values associated with the plurality of patterns, respectively; and detect, based on the comparison, a defect in at least one of the plurality of circuit structures.

2. The defect inspection system according to claim 1, wherein the statistical value comprises at least one of an average value, a mode, a standard deviation, or a median of the pixel values of the respective pattern.

3. The defect inspection system according to claim 1, wherein each of the plurality of circuit structures comprises at least one of a hole, an insulation device, a capacitor, an inductor, or a metal-oxide-semiconductor (MOS) device.

4. The defect inspection system according to claim 3, wherein each of the plurality of circuit structures corresponds to a same type of electronic component.

5. The defect inspection system according to claim 1, wherein in identifying, within the image of the semiconductor specimen, the plurality of patterns corresponding to the plurality of circuit structures formed on the semiconductor specimen, respectively, the controller is configured to cause the defect inspection system to:

align the image with an original design layout corresponding to the plurality of patterns; and identify portions of the image matching the original design layout.

6. The defect inspection system according to claim 5, wherein the original design layout comprises at least one of a graphic data system (GDS) file and an open artwork system interchange standard (OASIS) file.

7. The defect inspection system according to claim 1, wherein in identifying, within the image of the semiconductor specimen, the plurality of patterns corresponding to the plurality of circuit structures formed on the semiconductor specimen, respectively, the controller is configured to cause the defect inspection system to:

draw the plurality of patterns on the image.

8. The defect inspection system according to claim 1, wherein the image is obtained by using a scanning electron microscope (SEM) to scan or an optical means to capture a surface of the semiconductor specimen.

9. The computer-implemented inspection method according to claim 8, wherein the semiconductor specimen comprises a reticle or a wafer.

10. The defect inspection system according to claim 1, wherein the pixel values are gray levels of pixels in the plurality of patterns.

11. The defect inspection system according to claim 1, the controller is configured to cause the defect inspection system to:

locate the defect in the at least one of the plurality of circuit structures.

12. The defect inspection system according to claim 1, wherein:

the inspection tool is configured to scan the semiconductor specimen with one or more primary charged-particle beams and to receive detection signals corresponding to one or more sets of secondary charged particles reflected from the semiconductor specimen; and the controller is configured to cause the defect inspection system to generate the image of the semiconductor specimen based on the detection signals.

13. A non-transitory computer-readable medium storing a set of instructions that is executable by one or more processors of one or more devices to cause the one or more devices to perform a method comprising:

identifying, within an image of a semiconductor specimen, a plurality of patterns corresponding to a plurality of circuit structures formed on the semiconductor specimen, respectively;

for each of the plurality of patterns, determining a statistical value associated with pixel values of the pattern;

performing a comparison of the statistical values associated with the plurality of patterns, respectively; and detecting, based on the comparison, a defect in at least one of the plurality of circuit structures.

14. The non-transitory computer-readable medium according to claim 13, wherein the statistical value comprises at least one of an average value, a mode, a standard deviation, or a median of the pixel values of the respective pattern.

15. The non-transitory computer-readable medium according to claim 13, wherein each of the plurality of circuit structures comprises at least one of a hole, an insulation device, a capacitor, an inductor, or a metal-oxide-semiconductor (MOS) device.

16. The non-transitory computer-readable medium according to claim 13, wherein each of the plurality of circuit structures corresponds to a same type of electronic component.

17. The non-transitory computer-readable medium according to claim 13, wherein the image is generated based on a secondary charged particle signal, a scanning electron microscope (SEM) signal, or an electromagnetic wave signal.

18. The defect inspection system according to claim 1, wherein the pixel values are gray levels of pixels in the plurality of patterns.

19. The non-transitory computer-readable medium according to claim 13, wherein the execution of the set of instructions further causes the one or more devices to perform:

locating the defect in the at least one of the plurality of circuit structures.

20. A computer-implemented inspection method, comprising:

identifying, within an image of a semiconductor specimen, a plurality of patterns corresponding to a plurality of circuit structures formed on the semiconductor specimen, respectively;

for each of the plurality of patterns, determining a statistical value associated with pixel values of the pattern;

performing a comparison of the statistical values associated with the plurality of patterns, respectively; and detecting, based on the comparison, a defect in at least one of the plurality of circuit structures.

* * * * *